United States Patent
Chen et al.

(10) Patent No.: US 8,279,267 B2
(45) Date of Patent: Oct. 2, 2012

(54) APPARATUS AND METHOD FOR CAPTURING IMAGES OF A SCENE

(75) Inventors: Wan-Yu Chen, Taipei County (TW); Chih-Hui Kuo, Hsinchu (TW); Yu-Lin Chang, Los Angeles, CA (US)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 683 days.

(21) Appl. No.: 12/400,750

(22) Filed: Mar. 9, 2009

(65) Prior Publication Data
US 2010/0225745 A1  Sep. 9, 2010

(51) Int. Cl.
*H04N 13/02* (2006.01)
*G03B 17/00* (2006.01)
*G03B 35/00* (2006.01)
(52) U.S. Cl. .............................. 348/49; 396/55; 396/324
(58) Field of Classification Search ............... 348/42–49, 348/302
See application file for complete search history.

(56) References Cited

U.S. PATENT DOCUMENTS

| | | | |
|---|---|---|---|
| 6,324,347 B1 | 11/2001 | Bacs, Jr. et al. | |
| 7,110,103 B2 * | 9/2006 | Montgomery et al. | 356/152.1 |
| 2005/0041566 A1 | 2/2005 | Haider | |
| 2008/0013941 A1 * | 1/2008 | Daley | 396/121 |
| 2008/0055571 A1 * | 3/2008 | Makii | 353/101 |

* cited by examiner

*Primary Examiner* — Wing Chan
*Assistant Examiner* — David X Yi
(74) *Attorney, Agent, or Firm* — Winston Hsu; Scott Margo

(57) ABSTRACT

An image capture apparatus includes an image sensor, a lens, an adjusting mechanism, and a controller. The image sensor is configured for detecting incident light to generate a corresponding captured image. The lens is configured for guiding light of a scene toward the image sensor. The adjusting mechanism is configured for adjusting a relative position relationship between the image sensor and the lens when the image capture apparatus is capturing the scene. The controller is configured for controlling the image sensor to generate a plurality of captured images of the scene in response to different relative position relationships between the image sensor and the lens.

18 Claims, 11 Drawing Sheets

APPARATUS AND METHOD FOR CAPTURING IMAGES OF A SCENE

BACKGROUND

The present invention relates to an image capture apparatus for capturing a scene and related method thereof, and more particularly, to an image capture apparatus and image capture method for generating a plurality of captured images of a scene through adjusting a relative position relationship between an image sensor and a lens in a direction substantially perpendicular to an optical axis direction of the lens when capturing the scene.

The production of two-dimensional images that can be displayed to provide a three-dimensional vision has been a long standing goal in the visual arts field. FIG. 1 is a diagram illustrating how the human depth perception creates a three-dimensional vision. A stereoscopic vision requires two eyes to view a scene with overlapping visual fields. For example, as shown in FIG. 1, each eye views an image point from a slightly different angle, and focuses the image point onto a retina. Next, the two-dimensional retinal images are combined in the human brain to form a three-dimensional vision. The disparity D of the image point refers to the difference in image location of an image point seen by the left eye and the right eye, resulting from a particular eye separation, and it is interpreted by the human brain as depth information associated with the image point. That is, when the image point is near, the disparity D on the screen plane is large; however, when the image point is far, the disparity D on the screen plane is small. More specifically, the disparity D is in inverse proportion to the depth interpreted by the human brain, i.e., $$\text{Disparity} \propto \frac{1}{\text{Depth}}.$$

To derive two-dimensional images that can be displayed for providing a three-dimensional vision, a conventional stereo image capture apparatus is devised to have a plurality of lenses included therein. For example, a conventional double-lens stereo camera has a left lens and a right lens, where the left lens is used in the production of a left captured image of a scene and the right lens is used in the production of a left captured image of the same scene. In addition to the left lens and the right lens, the conventional double-lens stereo camera requires a synchronous system to achieve the synchronous production of the right captured image and the left captured image. It is difficult to reduce the size and cost of the conventional double-lens stereo camera since lens contributes a large proportion in both size and cost of a camera. Besides, as the double-lens stereo camera has two lenses, it is incompatible with the general two-dimensional image capture system with a single lens.

Therefore, there is a need to devise a single-lens image capture apparatus capable of generating images which capture stereo contents of a scene.

SUMMARY

According to one aspect of the present invention, an image capture apparatus is disclosed. The image capture apparatus includes an image sensor, a lens, an adjusting mechanism, and a controller. The image sensor is configured for detecting incident light to generate a corresponding captured image. The lens is configured for guiding light of a scene toward the image sensor. The adjusting mechanism is configured for adjusting a relative position relationship between the image sensor and the lens in a direction perpendicular to an optical axis direction of the lens when the image capture apparatus is capturing the scene. The controller is configured for controlling the image sensor to generate a plurality of captured images of the scene in response to different relative position relationships between the image sensor and the lens.

According to another aspect of the present invention, an image capture method is disclosed. The image capture method includes following steps: when capturing a scene, adjusting a relative position relationship between an image sensor configured for detecting incident light to generate a corresponding captured image and a lens configured for guiding light of a scene toward the image sensor in a direction perpendicular to an optical axis direction of the lens; and controlling the image sensor to generate a plurality of captured images of the scene in response to different relative position relationships between the image sensor and the lens.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . .". The terms "couple" and "couples" are intended to mean either an indirect or a direct electrical connection. Thus, if a first device couples to a second device, that connection may be through a direct electrical connection, or through an indirect electrical connection via other devices and connections.

To put it simply, the conception of the present invention is to use a single lens to generate a plurality of captured images of a scene through adjusting a relative position relationship between the image sensor and the lens in a direction substantially perpendicular to an optical axis direction of the lens when capturing the scene. For example, to capture stereo contents of the scene, the relative position relationship between the image sensor and the lens in a horizontal direction perpendicular to the optical axis direction of the lens is adjusted to allow the image sensor to generate a left captured image and a right captured image. To more clearly illustrate features of the present invention, certain exemplary embodiments are given as follow.

Figure 2:
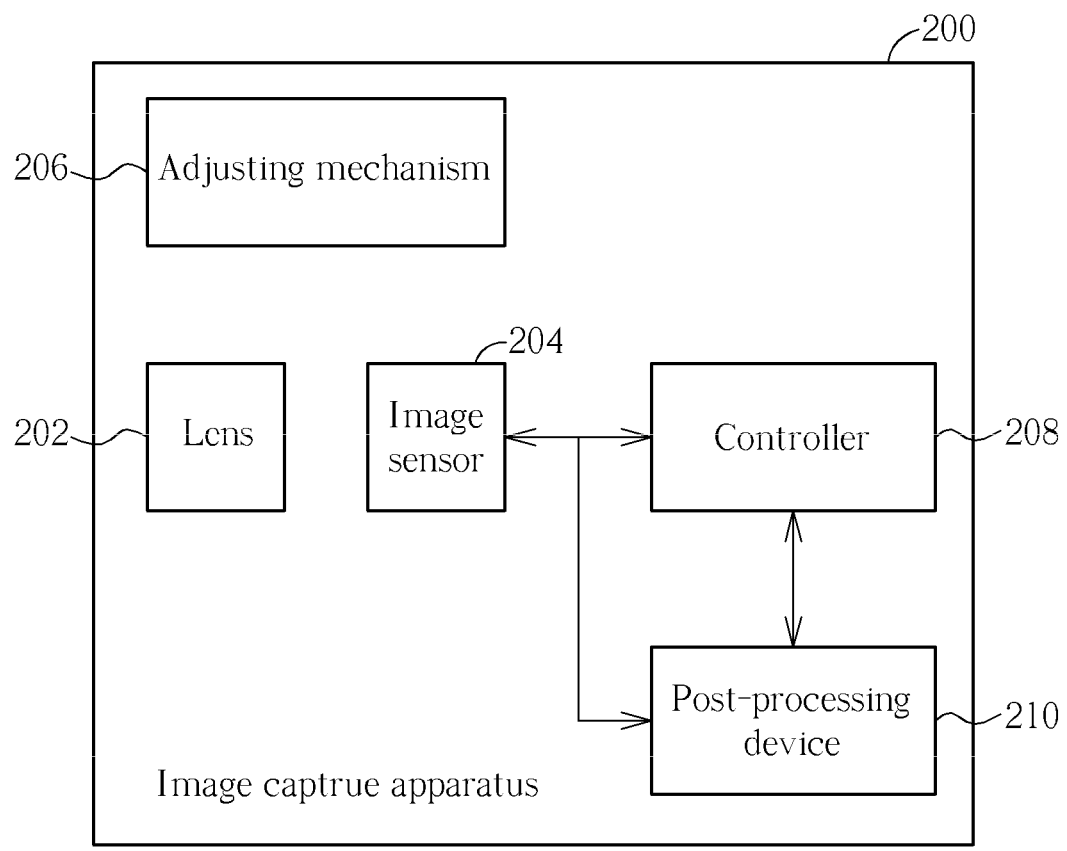
FIG. 2 is a block diagram illustrating a first exemplary embodiment of an image capture apparatus according to the present invention.

FIG. 2 is a block diagram illustrating a first exemplary embodiment of an image capture apparatus according to the present invention. The image capture apparatus 200 (e.g., a digital still/video camera) includes, but is not limited to, a lens 202, an image sensor 204, an adjusting mechanism 206, a controller 208, and a post-processing device 210. The image sensor 204, such as a CCD (Charge Coupled Device) sensor or CMOS (Complementary Metal Oxide Semiconductor) sensor, is configured for detecting incident light to generate a corresponding captured image. The lens 202 is configured for guiding light of a scene toward the image sensor 204. The adjusting mechanism 206 is configured for adjusting a relative position relationship between the image sensor 204 and the lens 202 when the image capture apparatus 200 is capturing the scene (i.e., when a shutter button has been depressed by the user). For example, the adjusting mechanism 206 adjusts the relative position relationship in a direction substantially perpendicular to an optical axis direction of the lens 202. The controller 208 is configured for controlling the image sensor 204 to generate a plurality of captured images of the scene in response to different relative position relationships between the image sensor 204 and the lens 202.

Figure 3:
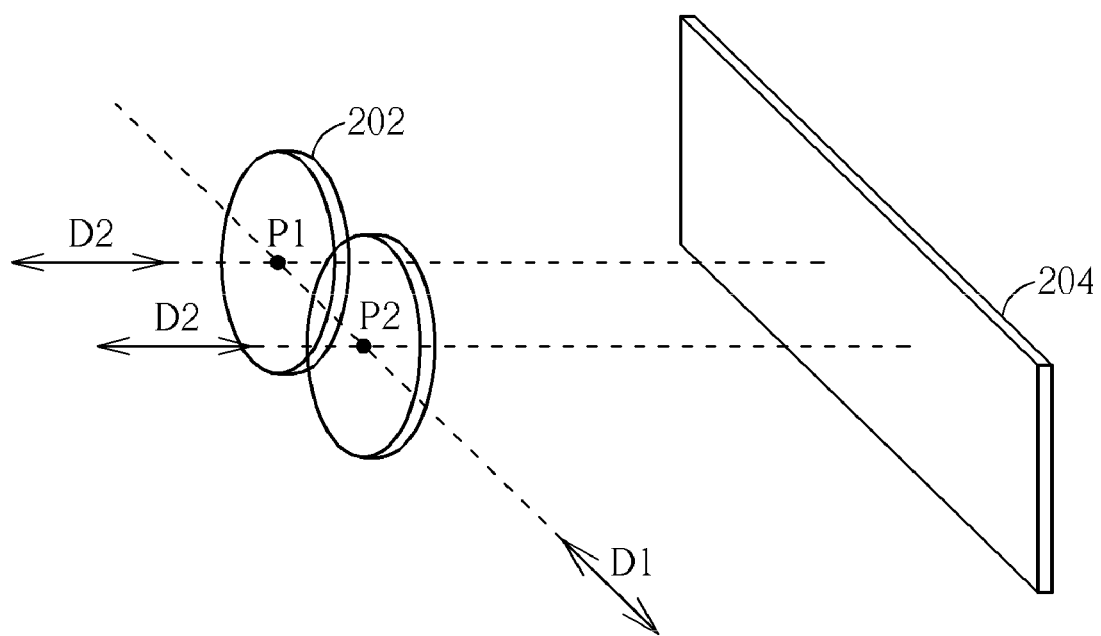
FIG. 3 is a diagram illustrating one exemplary adjustment made to the relative position relationship between an image sensor and a lens when an image capture apparatus is capturing a scene.

In one implementation, the lens 202 is implemented using a floating lens which is movable in a direction perpendicular to the optical axis direction, whereas the image sensor 204 is immovable. Therefore, as the lens 202 is movable, the adjusting mechanism 206 can easily achieve the objective of adjusting the relative position relationship between the image sensor 204 and the lens 202 in a direction perpendicular to the optical axis direction of the lens 202. FIG. 3 is a diagram illustrating one exemplary adjustment made to the relative position relationship between the image sensor 204 and the lens 202 when the image capture apparatus 200 is capturing a scene. In this example, the adjusting mechanism 206 adjusts the relative position relationship between the stationary image sensor 204 and the movable lens 202 in a horizontal direction D1 perpendicular to an optical axis direction D2 of the lens 202 by moving the lens 202. The image capture apparatus captures time-interleaved left and right images for generating stereo contents of the scene. Specifically, when the lens 202 is located at position P1, a right captured image is derived, and when the lens 202 is located at position P2, a left captured image is derived.

Figure 4:
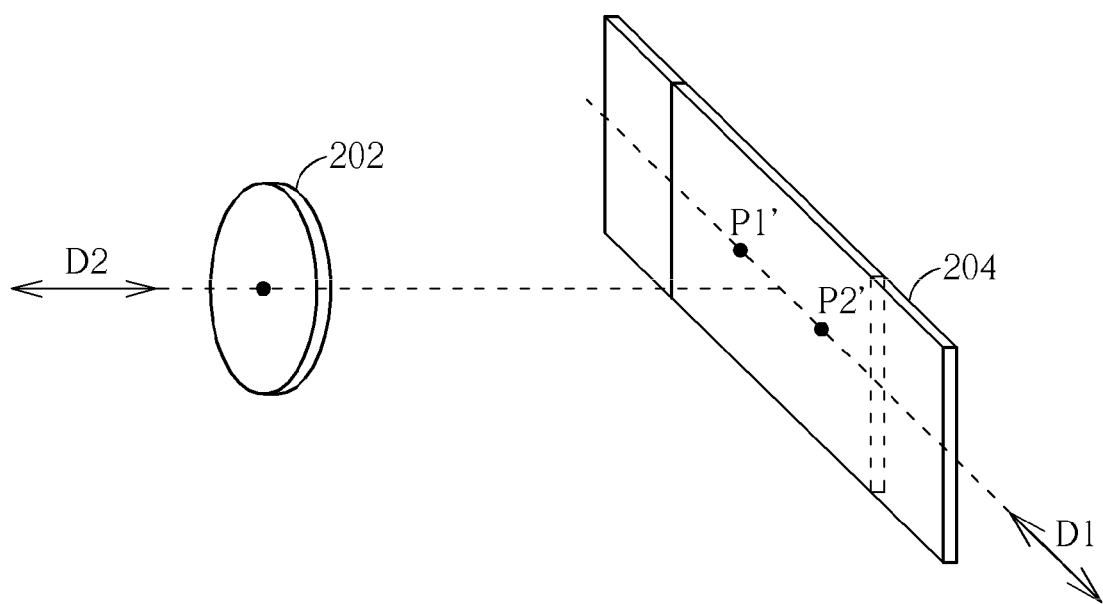
FIG. 4 is a diagram illustrating another exemplary adjustment made to the relative position relationship between an image sensor and a lens when an image capture apparatus is capturing a scene.

In another implementation, the image sensor 204 is implemented using a floating image sensor which is movable in a direction perpendicular to the optical axis direction. Therefore, as the image sensor 204 is movable, the adjusting mechanism 206 can easily achieve the objective of adjusting the relative position relationship between the image sensor 204 and the lens 202 in a direction substantially perpendicular to the optical axis direction of the lens 202. FIG. 4 is a diagram illustrating this exemplary adjustment made to the relative position relationship between the image sensor 204 and the lens 202 when the image capture apparatus 200 is capturing a scene. In this example, the adjusting mechanism 206 adjusts the relative position relationship between the movable image sensor 204 and the stationary lens 202 in a horizontal direction D1 perpendicular to an optical axis direction D2 of the lens 202 to allow capturing time-interleaved left and right images for generating stereo contents of the scene. Specifically, when the image sensor 204 is located at position P1', a right captured image is derived, and when the image sensor 204 is located at position P2', a left captured image is derived.

Please note that when the image capture apparatus 200 is capturing a scene, the adjusting mechanism 206 can adjust the relative position relationship between the image sensor 204 and the lens 202 in an active manner or a passive manner. For example, the adjusting mechanism 206 includes supporting and guiding components connected to a specific movable optical component (e.g., the lens 202 in FIG. 3 or the image sensor 204 in FIG. 4) to allow the specific movable optical component to move in a particular direction (e.g., the horizontal direction D1) perpendicular to the optical axis direction D2 of the lens 202. In a case where user's hand shake is significant, the external hand shake force is large enough to drive the image capture apparatus 200 to move in the horizontal direction D1 without the active intervention of the adjusting mechanism 206. That is, the adjusting mechanism 206 does not have to provide additional driving force, for example, by an internal motor (not shown) to make the lens 202 in FIG. 3 or the image sensor 204 in FIG. 4 move for a requested distance in the horizontal direction D1, and the adjusting mechanism 206 simply provides passive guidance for the timing of capturing two or more images. In another case where user's hand shake is insignificant or negligible, the adjusting mechanism 206 actively offers a driving force, for example, by an internal motor (not shown) to drive the lens 202 in FIG. 3 or the image sensor 204 in FIG. 4 to move in the horizontal direction D1. It should be noted that the above-mentioned examples are for illustrative purposes only. Any mechanism capable of adjusting a relative position relationship between the image sensor and the lens in a direction perpendicular to an optical axis direction of the lens when the image capture apparatus is capturing the scene can be employed to realize the adjusting mechanism 206 in the image capture apparatus 200 shown in FIG. 2. These alternative designs still obey the spirit of the present invention.

As shown in FIG. 2, the image capture apparatus 200 has a post-processing device 210 implemented therein. The post-processing device 210 performs post-processing on captured images, for example, it enhances the stereo effect of the captured images. In an embodiment, the controller 208 enables the post-processing device 210 to generate post-processed captured images according to the captured images generated when a displacement of the relative position relationships between the image sensor 204 and the lens 202 in the horizontal direction D1 is less than a predetermined threshold. For example, when the displacement between positions P1 and P2 in FIG. 3 (or P1' and P2' in FIG. 4) is less than a predetermined threshold, meaning that the disparity between the captured images is too small to meet the requirements, the post-processing device 210 is therefore enabled to enhance the disparity by performing a disparity estimation upon the captured images to generate a depth map, enhancing contrast in the depth map to generate an enhanced depth map, and generating post-processed captured images according to the enhanced depth map and the captured images. In one implementation, a conventional depth image based rendering (DIBR) technique can be employed by the post-processing device 210 to derive the post-processed captured images according to the enhanced depth map and the captured images. Please note that the post-processing 210 is an optional component, and can be omitted in other exemplary embodiments of the present invention.

The present invention can be applied to a variety of fields, such as digital still/video camera related application, face detection application which uses depth information derived from the captured images, stereo image generation, three-dimensional display, etc. Please note that the image capture apparatus 200 is not limited to capturing two images, including a left image and a right image of a scene, by moving either the lens 202 or image sensor 204 in a horizontal direction of the image capture apparatus 200. Any image capture apparatus which generates a plurality of captured images of a scene through adjusting a relative position relationship between an image sensor and a lens in a direction substantially perpendicular to an optical axis direction of the lens when capturing the scene obeys the spirit of the present invention, and falls within the scope of the present invention.

Figure 5:
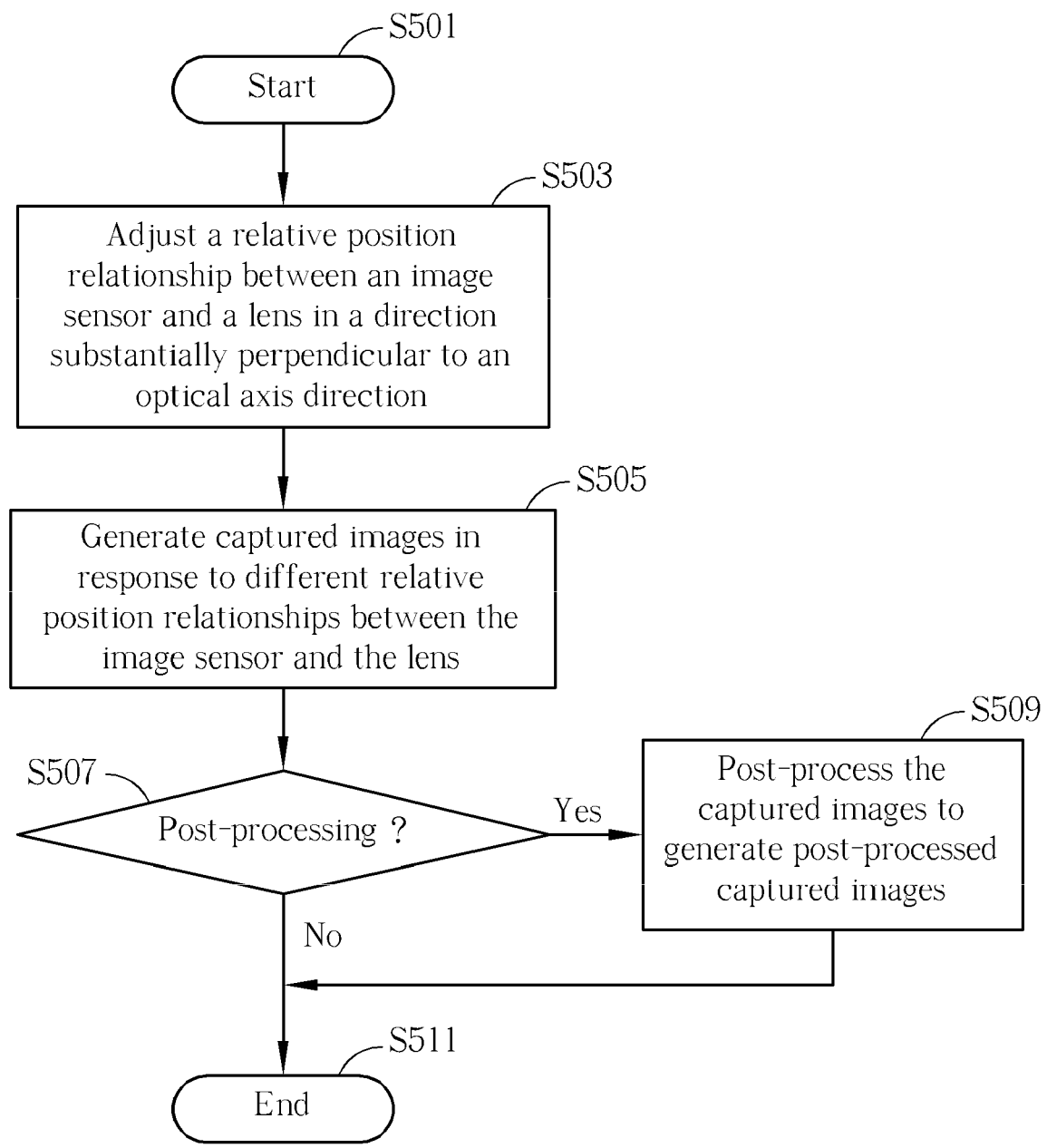
FIG. 5 is a flowchart illustrating a generalized image capture method according to an exemplary embodiment of the present invention.

For clarity, the method employed by the image capture apparatus 200 shown in FIG. 2 can be briefly summarized using the flow shown in FIG. 5. Please note that if the result is substantially the same, the steps are not required to be executed in the exact order shown in FIG. 5. The generalized image capture method according to an exemplary embodiment of the present invention includes following steps:

S501: Start.

S503: When capturing a scene, adjust a relative position relationship between an image sensor and a lens in a direction (e.g., a horizontal) substantially perpendicular to an optical axis direction of the lens.

S505: Control the image sensor to generate a plurality of captured images in response to different relative position relationships between the image sensor and the lens in the direction substantially perpendicular to the optical axis direction.

S507: Check if the post-processing should be applied to the captured images generated from the image sensor. If yes, go to step S508; otherwise, go to step S510.

S509: Perform the post-processing upon the captured images to generate post-processed captured images.

S511: End.

It should be noted that steps S506 and S508 are optional, and can be omitted according to design requirements. Furthermore, as a person skilled in the art can readily understand details of each step after reading above paragraphs, further description is omitted here for brevity.

Figure 6:
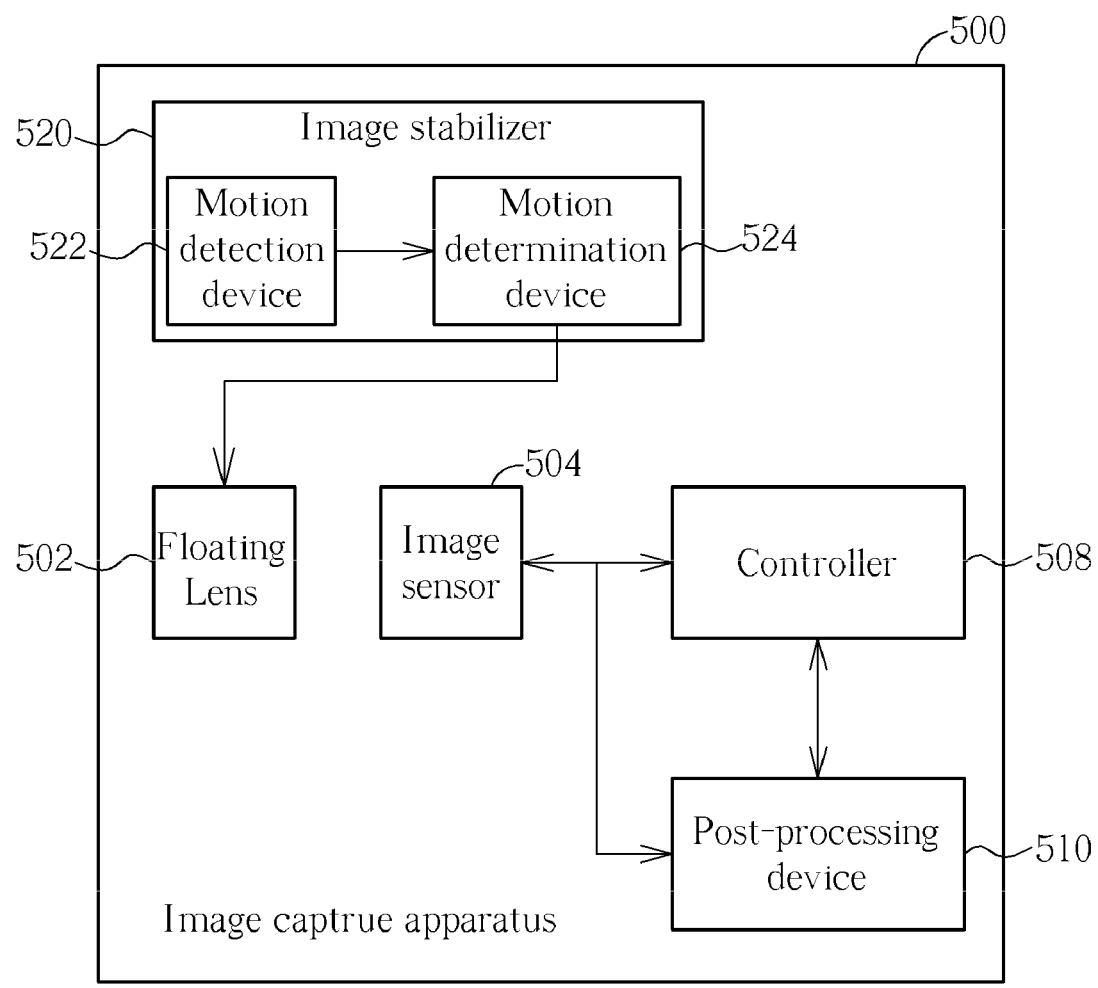
FIG. 6 is a block diagram illustrating a second exemplary embodiment of an image capture apparatus according to the present invention.

To be compatible with the general single-lens camera, the present invention also proposes exploiting an image stabilizer to achieve an objective of capturing stereo contents of a scene. FIG. 6 is a block diagram illustrating a second exemplary embodiment of an image capture apparatus according to the present invention. The image capture apparatus 500 (e.g., a digital still/video camera) includes, but is not limited to, a floating lens 502, an image sensor 504, a controller 508, an optional post-processing device 510, and an image stabilizer 520. In this embodiment, the image stabilizer 520 includes a motion detection device 522 and a motion determination device 524. The motion detection device 522 is implemented for detecting motion in a first direction (e.g., a vertical direction) and motion in a second direction (e.g., a horizontal direction), wherein the first direction and the second direction are perpendicular to an optical axis direction of the floating lens 502, and the first direction is perpendicular to the second direction. For instance, the motion detection device 522 includes two sensors for detecting the horizontal camera motion and the vertical camera motion, respectively. The motion determination device 524 is coupled to the motion detection device 522 and the floating lens 502, and implemented for compensating the motion in the first direction while reserving or increasing the motion in the second direction by moving the floating lens 502.

In this exemplary embodiment shown in FIG. 6, the image stabilizer 520 is implemented to realize the afore-mentioned adjusting mechanism 206 in FIG. 2. The image stabilizer 520 is therefore configured to adjust a relative position relationship between the image sensor 504 and the floating lens 502 in a direction substantially perpendicular to an optical axis direction of the floating lens 502 when the image capture apparatus 500 is capturing a scene (i.e., when a shutter button has been depressed by the user). Specifically, when the image capture apparatus 500 is used to capture stereo contents of a scene, the image stabilizer 520 moves the floating lens 502 in a horizontal direction perpendicular to the optical axis direction of the lens 502. The operation is similar to that shown in FIG. 3. In contrast to the conventional image stabilizer which applies compensation to the motion detected in the vertical direction as well as the horizontal direction, the image stabilizer 520, however, does not apply compensation to the motion detected in the horizontal direction. In addition, the image stabilizer 520 can be configured to further enlarge the motion in the horizontal direction to increase the moving distance of the floating lens 502. For example, the image stabilizer 520 enhances the motion in the horizontal direction to make the floating lens 502 have a maximum moving distance defined by the constraints of the anti-handshake design. More specifically, as the motion in the horizontal direction is reserved or increased under the control of the motion determination device 524, the floating lens 502 is allowed to move in the horizontal direction perpendicular to the optical axis direction of the lens 502. In this way, a left captured image and a right captured image which are used to render stereo contents of a scene can be obtained successfully. As the floating lens 502 changes its location when the image capture apparatus 500 is capturing the scene, the same objective of adjusting the relative position relationship between the image sensor and the lens is achieved. Since a person skilled in the art can readily understand details of other components included in the image capture apparatus 500 after reading above paragraphs directed to the image capture apparatus 200, further description is omitted here for brevity.

Furthermore, the timing of image capturing is tunable, depending upon design requirements. In one implementation, the image sensor 504 generates all of the captured images, such as the left captured image and the right captured image, after the motion determination device 524 determines how to control the movement of the floating lens 502, for example, the motion determination device 524 determines a moving distance from one capture position to another. The image capture apparatus moves the floating lens 502 to capture images according to a detection result generated from the motion detection device 522. Taking the diagram shown in FIG. 3 for example, the right captured image is captured while the moving floating lens 502 reaches the position P1 under the control of the motion determination device 524, and the left captured image is captured when the floating lens 502 keeps moving to the position P2 from the position P1 under the control of the motion determination device 524. In another implementation, the image sensor 504 generates a first captured image before the motion determination device 524 determines how to control the movement of the floating lens 502. The motion determination device 524 then moves the floating lens 502 according to a detection result generated from the motion detection device 522 to capture a second captured image. Taking the diagram shown in FIG. 3 for example, the right captured image is captured when the floating lens 502, which is moving or stays still, is at the position P1. The motion determination device 524, based on a detection result generated from the motion detection device 522, moves the floating lens 502 to the position P2 to capture the left captured image.

Figure 7:
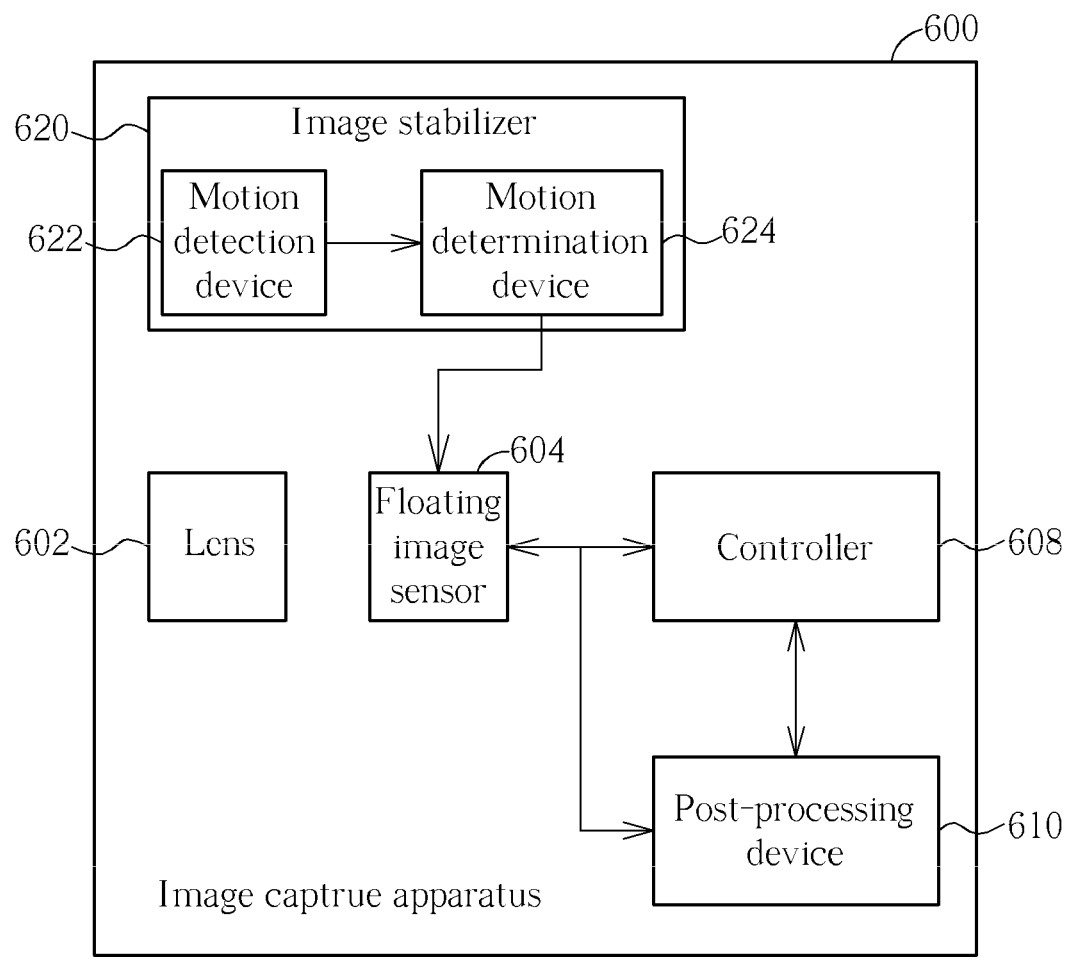
FIG. 7 is a block diagram illustrating a third exemplary embodiment of an image capture apparatus according to the present invention.

FIG. 7 is a block diagram illustrating a third exemplary embodiment of an image capture apparatus according to the present invention. The image capture apparatus 600 (e.g., a digital still/video camera) includes, but is not limited to, a lens 602, a floating image sensor 604, a controller 608, an optional post-processing device 610, and an image stabilizer 620. In this embodiment, the image stabilizer 620 includes a motion detection device 622 and a motion determination device 624. The function and operation of the image stabilizer 620 are similar to that of the image stabilizer 520 shown in FIG. 6. The difference is that the motion determination device 624 is used to control the compensation applied to the floating image sensor 604.

In this exemplary embodiment shown in FIG. 7, the image stabilizer 620 is implemented to realize the afore-mentioned adjusting mechanism 206 in FIG. 2. The image stabilizer 620 is therefore configured to adjust a relative position relationship between the floating image sensor 604 and the lens 602 in a direction substantially perpendicular to an optical axis direction of the lens 602 when the image capture apparatus 600 is capturing a scene. Specifically, when the image capture apparatus 600 is used to capture stereo contents of a scene, the image stabilizer 620 moves the floating image sensor 604 in a horizontal direction perpendicular to the optical axis direction of the lens 602. The operation is similar to that shown in FIG. 4. In this way, a left captured image and a right captured image which capture stereo contents of a scene can be obtained successfully. As the floating image sensor 604 changes its location when the image capture apparatus 600 is capturing the scene, the same objective of adjusting the relative position relationship between the image sensor and the lens is achieved. Since a person skilled in the art can readily understand details of the components included in the image capture apparatus 600 after reading above paragraphs directed to the aforementioned image capture apparatuses 200 and 500, further description is omitted here for brevity.

Regarding the embodiment shown in FIG. 7, the timing of generating the captured images is also tunable, depending upon design requirements. In one implementation, the floating image sensor 604 generates all of the captured images, such as the left captured image and the right captured image, after the motion determination device 624 determines the movement of the floating image sensor 604 according to a detection result generated from the motion detection device 622. Taking the diagram shown in FIG. 4 for example, after the motion determination device 624 determines how to move the floating image sensor 604, the left captured image is captured while the floating image sensor 604 moves to the position P1' under the control of the motion determination device 624, and the right captured image is captured when the floating image sensor 604 keeps moving to the position P2' from the position P1' under the control of the motion determination device 624. In another implementation, the floating image sensor 604 generates a first captured image before the motion determination device 624 determines the movement of the floating image sensor 604 according to a detection result generated from the motion detection device 622, then it generates a second captured image after the motion determination device 624 determines how to move the floating image sensor 604 according to the detection result. Taking the diagram shown in FIG. 4 for example, the left captured image is captured when the floating image sensor 604, which is moving or stays still, is at the position P1', and then after the motion determination device 624 determines how to move the floating image sensor 604 to the position P2', the left captured image is captured.

Figure 1:
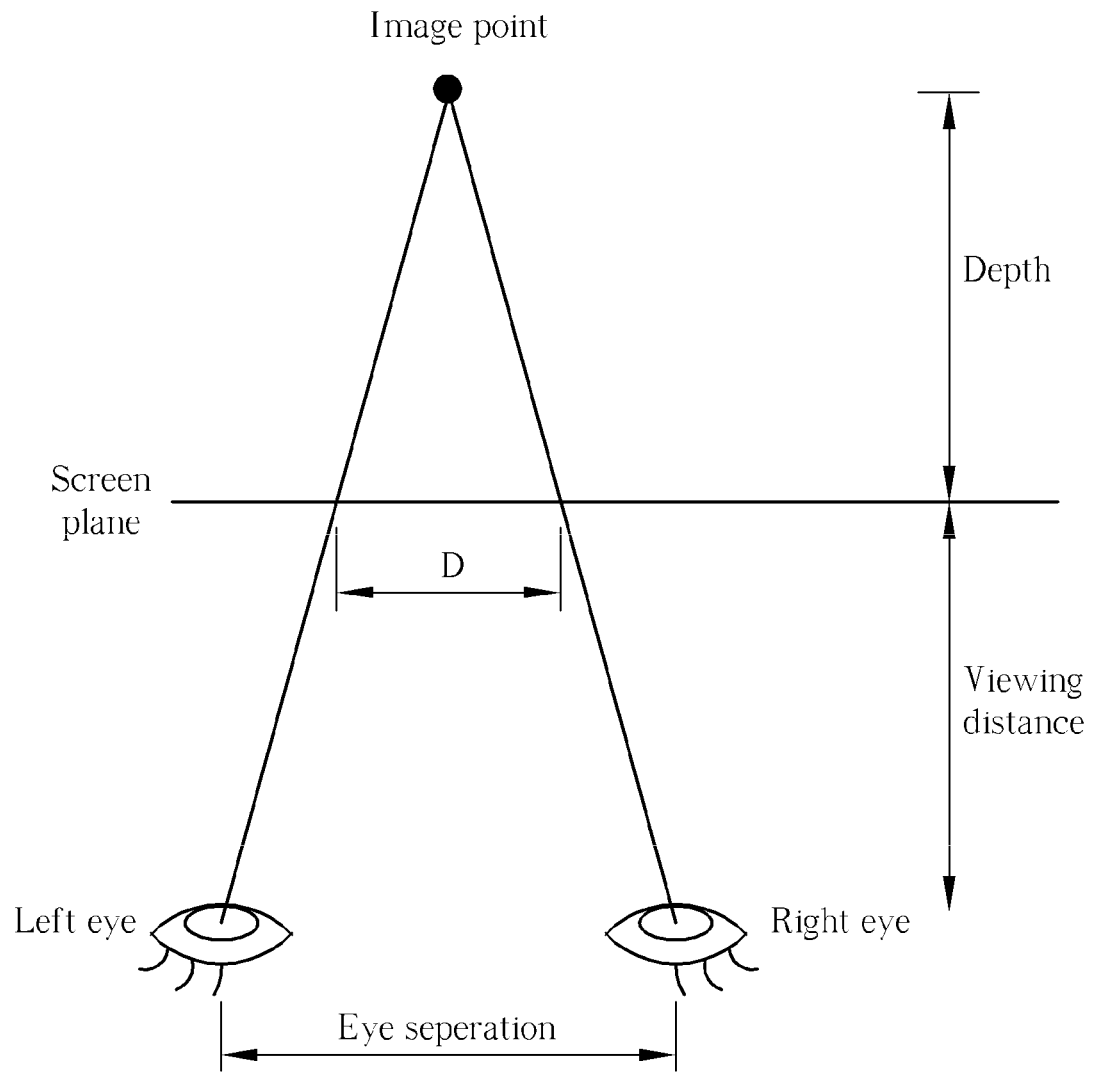
FIG. 1 is a diagram illustrating how the human depth perception creates a three-dimensional vision.
Figure 8:
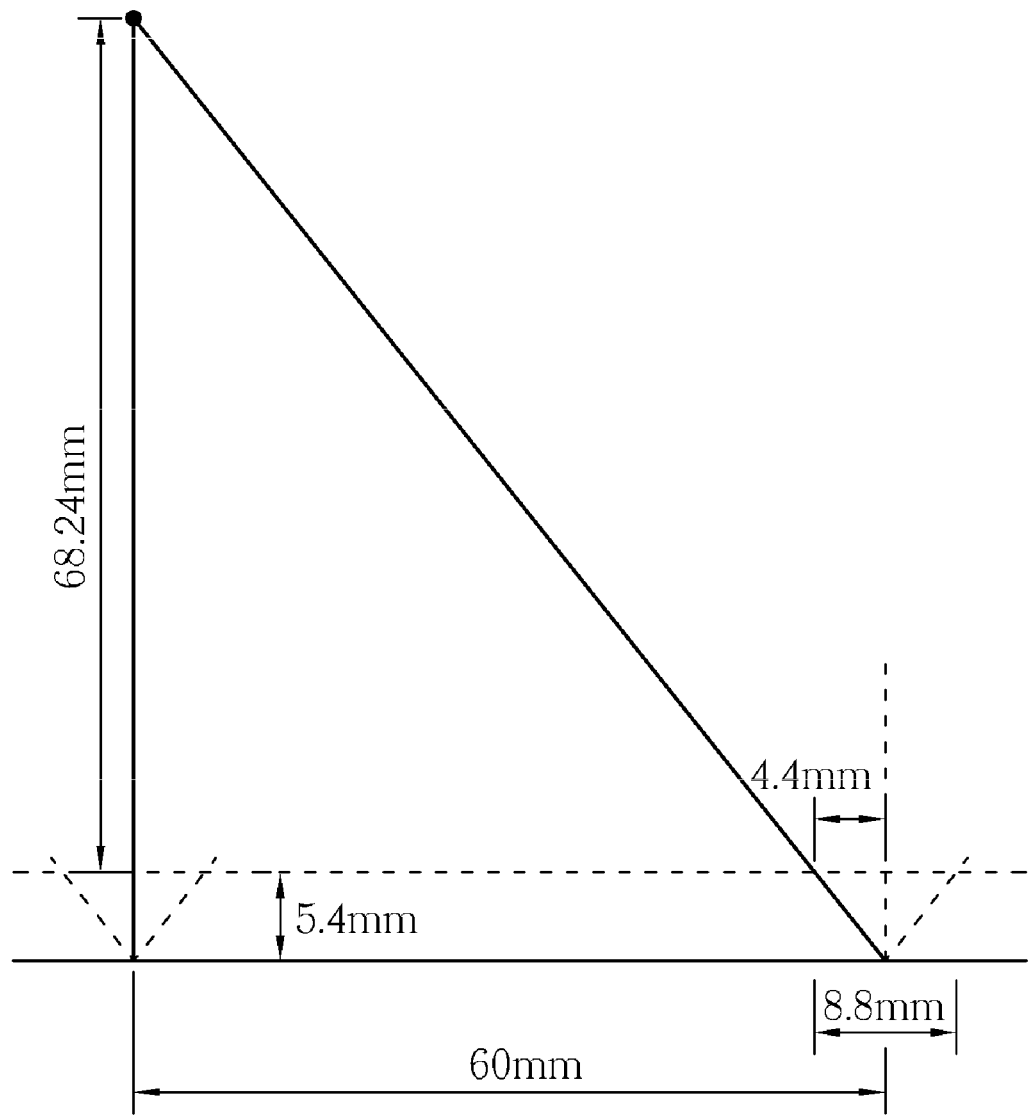
FIG. 8 is a diagram illustrating measurement of a nearest depth for a common stereo depth estimation.
Figure 9:
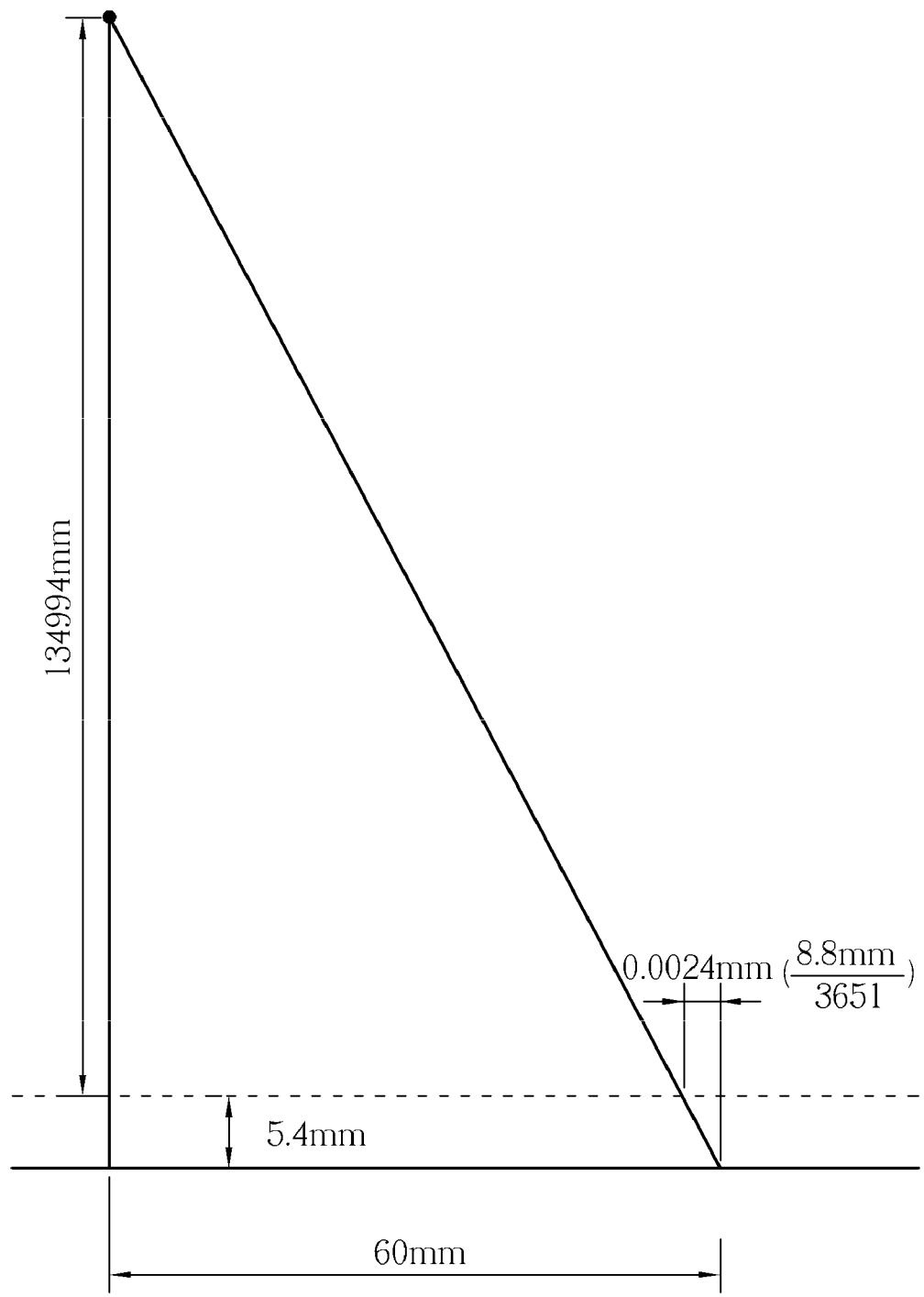
FIG. 9 is a diagram illustrating measurement of a furthest depth for a common stereo depth estimation.
Figure 10:
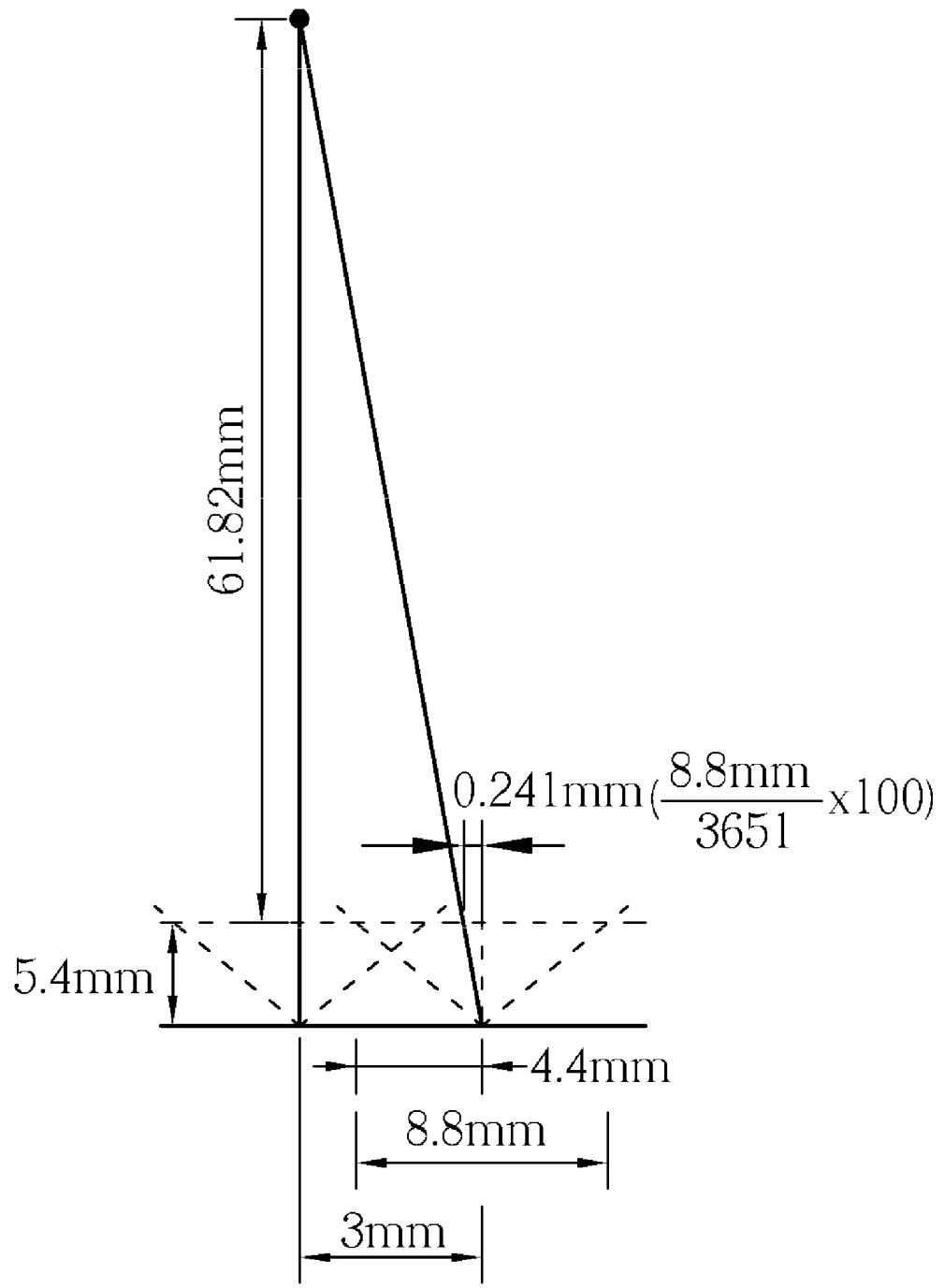
FIG. 10 is a diagram illustrating measurement of a nearest depth for a stabilized lens' depth estimation.
Figure 11:
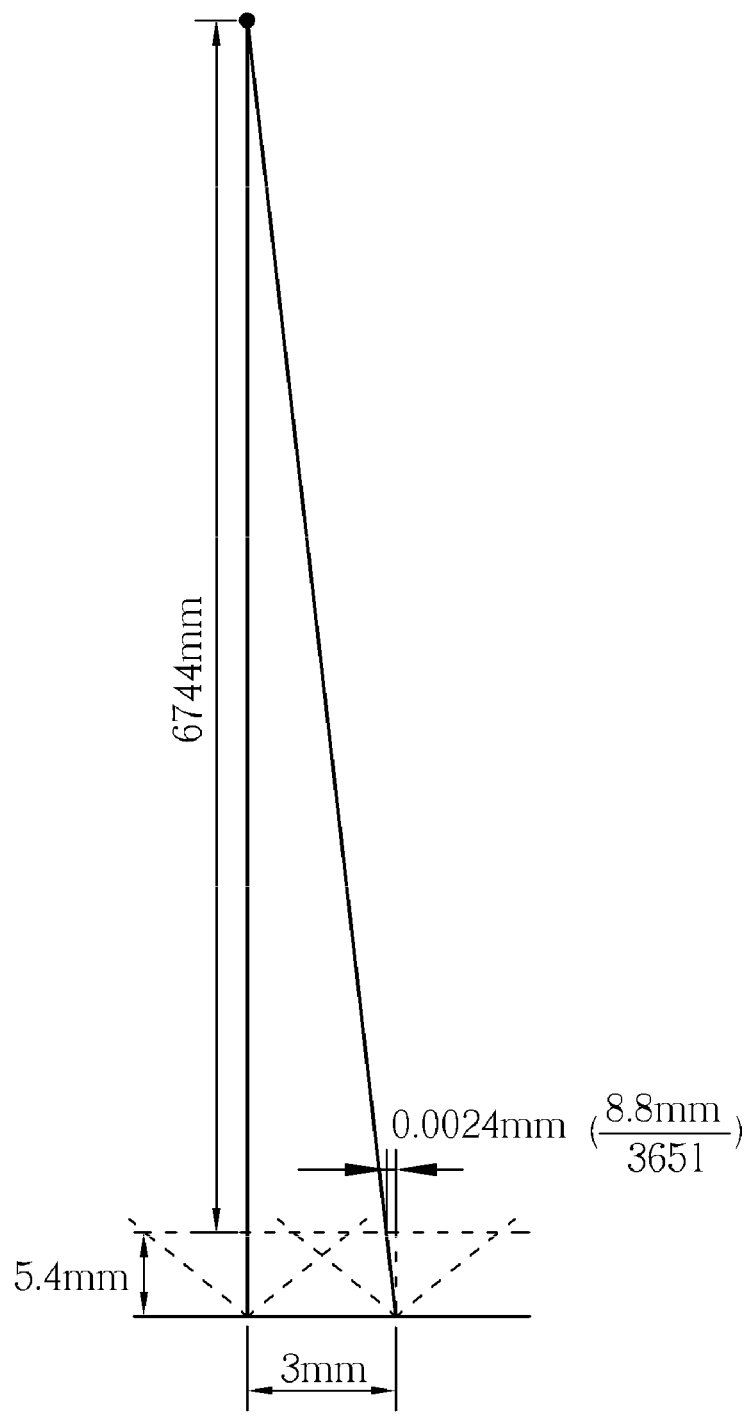
FIG. 11 is a diagram illustrating measurement of a furthest depth for a stabilized lens' depth estimation.

The following illustrates that a camera which exploits an optical image stabilizer system to capture time-interleaved left image and right image according to the present invention can have an acceptable capture depth range. FIG. 8 is a diagram illustrating measurement of a nearest depth for a common stereo depth estimation. FIG. 9 is a diagram illustrating measurement of a furthest depth for a common stereo depth estimation. FIG. 10 is a diagram illustrating measurement of a nearest depth for a stabilized lens' depth estimation. FIG. 11 is a diagram illustrating measurement of a furthest depth for a stabilized lens' depth estimation. Suppose that the following camera model is adopted: ¾ CCD (6.6 mm×8.8 mm) with 10M pixels and 5.4 mm focal length (wide angle). Besides, the eye separation distance for the common stereo depth estimation is assumed to be 60 mm, as illustrated in FIG. 8 and FIG. 9, and the hand shake range (i.e., the maximum floating lens moving range or floating image sensor moving range) for the stabilized lens' depth estimation is assumed to be 3 mm, as illustrated in FIG. 10 and FIG. 11. Please note that the scale shown in FIG. 8-FIG. 11 is for illustrative purposes only. In FIG. 8, the maximum perceivable difference on the CCD sensor is equal to 4.4 mm, and the nearest measured depth is equal to 68.24 mm. In FIG. 9, the minimum perceivable difference on the CCD sensor is equal to 0.0024 mm which is the distance between two adjacent pixels (i.e., $$\frac{8.8 \text{ mm}}{3651 \text{ pixels}} * 1 \text{ pixel}),$$

and the furthest measured depth is equal to 134994 mm. With regard to the stabilized lens' depth estimation, the minimum detected handshake in the horizontal direction for a camera with an image sensor having 10M pixels is about 100 pixels. In FIG. 10, the maximum perceivable difference on the CCD sensor is equal to 0.241 mm (i.e., $$\frac{8.8 \text{ mm}}{3651 \text{ pixels}} * 100 \text{ pixels}),$$

and the nearest measured depth is equal to 61.82 mm. In FIG. 1, the minimum perceivable difference is equal to 0.0024 mm which is the distance between two adjacent pixels, and the furthest measured depth is equal to 6744 mm. In view of above depth estimation analysis, a camera exploiting an image stabilizer to achieve an objective of capturing stereo contents of a scene according to the present invention can capture the depth range from 61.82 mm to 6744 mm when the hand shake range (i.e., the maximum floating lens moving range or floating image sensor moving range) is 3 mm. In other words, such a camera is capable of capturing the depth of an indoor scene which is captured in most cases. However, it should be noted that if the floating lens/image sensor is allowed to move more, furthest captured depth can be increased.

Those skilled in the art will readily observe that numerous modifications and alterations of the device and method may be made while retaining the teachings of the invention.

What is claimed is:

1. An image capture apparatus, comprising:
  an image sensor, configured for detecting incident light to generate a corresponding captured image;
  a lens, configured for guiding light of a scene toward the image sensor;
  an image stabilizer, configured for
    detecting a motion of the image capture apparatus when the image capture apparatus is capturing the scene; and
    adjusting a relative position relationship between the image sensor and the lens according to the motion and a predetermined relative position relationship; and
  a controller, configured for controlling the image sensor to generate a first captured image of the scene in response to a first relative position relationship and a second captured image of the scene in response to an adjusted relative position relationship;
  wherein the image stabilizer adjusts the relative position relationship between the image sensor and the lens in a direction perpendicular to the optical axis direction to allow the image sensor to generate the captured images which capture stereo contents of the scene; and
  wherein at least one of the lens and the image sensor is a floating device, and the relative position relationship between the image sensor and the lens varies due to a movement of the floating device.

2. The image capture apparatus of claim 1, further comprising:
  a post-processing device, configured for performing a disparity estimation upon the captured images to generate a depth map, enhancing contrast in the depth map to generate an enhanced depth map, and generating post-processed captured images according to the enhanced depth map and the captured images.

3. The image capture apparatus of claim 2, wherein the controller enables the post-processing device to generate the post-processed captured images when a displacement of the relative position relationships between the image sensor and the lens is less than a predetermined threshold.

4. The image capture apparatus of claim 1, wherein the image stabilizer which includes:
  a motion detection device, configured for detecting motion in a first direction and motion in a second direction, wherein the first direction and the second direction are perpendicular to the optical axis direction, and the first direction is perpendicular to the second direction; and
  a motion determination device, coupled to the motion detection device and the floating device, and configured for compensating the detected motion in the first direction while reserving or increasing the detected motion in the second direction by moving the floating device, thereby adjusting the relative position relationship between the image sensor and the lens.

5. The image capture apparatus of claim 4, wherein the first direction is a vertical direction relative to the optical axis direction, and the second direction is a horizontal direction relative to the optical axis direction.

6. The image capture apparatus of claim 1, wherein the image sensor generates the first captured image before the motion determination device determines the movement of the floating device according to a detection result generated from the motion detection device, and then generates the second captured image after the motion determination device determines the movement of the floating device according to the detection result.

7. An image capture method for an image capture apparatus, comprising:
  when capturing a scene, detecting a motion of the image capture apparatus and adjusting a relative position relationship between an image sensor and a lens according to the motion and a predetermined relative position relationship, wherein the image sensor is configured for detecting incident light to generate a corresponding captured image, and the lens is configured for guiding light of the scene toward the image sensor; and
  controlling the image sensor to generate a first captured image of the scene in response to a first relative position relationship and a second captured image of the scene in response to an adjusted relative position relationship;
  wherein adjusting the relative position relationship between the image sensor and the lens comprises:
  adjusting the relative position relationship between the image sensor and the lens in a direction perpendicular to the optical axis direction for allowing the image sensor to generate the captured images which capture stereo contents of the scene; and
  wherein at least one of the lens and the image sensor is a floating device, and the relative position relationship between the image sensor and the lens varies due to a movement of the floating device.

8. The image capture method of claim 7, further comprising:
  post-processing the captured images to generate post-processed captured images by:
  performing a disparity estimation upon the captured images to generate a depth map;
  enhancing contrast in the depth map to generate an enhanced depth map; and
  generating the post-processed captured images according to the enhanced depth map and the captured images.

9. The image capture method of claim 8, wherein post-processing the captured images to generate the post-processed captured images is enabled when a displacement of the relative position relationships between the image sensor and the lens in the horizontal direction is less than a predetermined threshold.

10. The image capture method of claim 7, wherein adjusting the relative position relationship between the image sensor and the lens comprises:
  detecting motion in a first direction and motion in a second direction, wherein the first direction and the second direction are perpendicular to the optical axis direction, and the first direction is perpendicular to the second direction; and
  determining the movement of the floating device to compensate the motion in the first direction while reserving or increasing the motion in the second direction by moving the floating device, thereby adjusting the relative position relationship between the image sensor and the lens.

11. The image capture method of claim 10, wherein the first direction is a vertical direction relative to the optical axis direction, and the second direction is a horizontal direction relative to the optical axis direction.

12. The image capture method of claim 10, wherein controlling the image sensor to generate the captured images of the scene comprises:

before determining the movement of the floating device, generating a first captured image; and after determining the movement of the floating device, generating a second captured image.

13. The image capture apparatus of claim 1, wherein the motion of the image capture apparatus is the motion between capturing the first image of the scene and capturing the second image of the scene.

14. The image capture apparatus of claim 1, wherein the predetermined relative position relationship between the image sensor and the lens is the movement of the relative position between the image sensor and the lens for capturing the second image of the scene as the image capture apparatus is static.

15. The image capture apparatus of claim 1, wherein the image capture apparatus captures the first image of the scene for one of a left eye and a right eye, and the image capture apparatus captures the second image of the scene for the other of the left eye and the right eye.

16. The image capture method of claim 7, wherein the motion of the image capture apparatus is the motion between capturing the first image of the scene and capturing the second image of the scene.

17. The image capture method of claim 7, wherein the predetermined relative position relationship between the image sensor and the lens is the movement of the relative position between the image sensor and the lens for capturing the second image of the scene as the image capture apparatus is static.

18. The image capture method of claim 7, wherein the first image of the scene is for one of a left eye and a right eye, and the second image of the scene is for the other of the left eye and the right eye.

\* \* \* \* \*